United States Patent Office 2,901,752
Patented Sept. 1, 1959

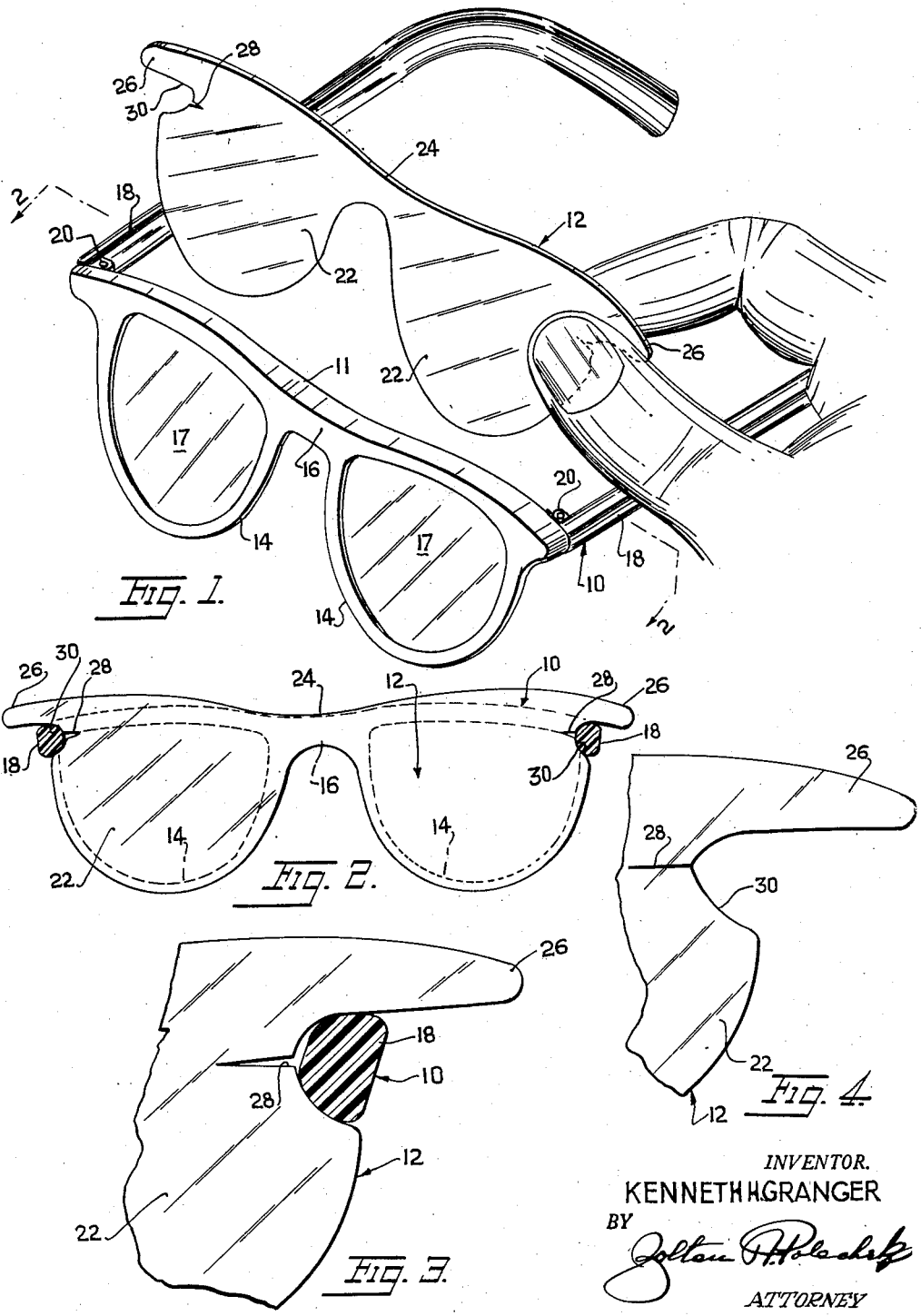

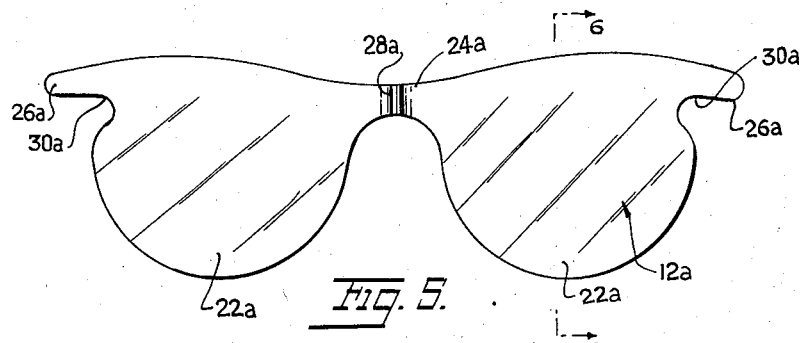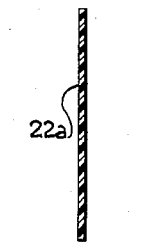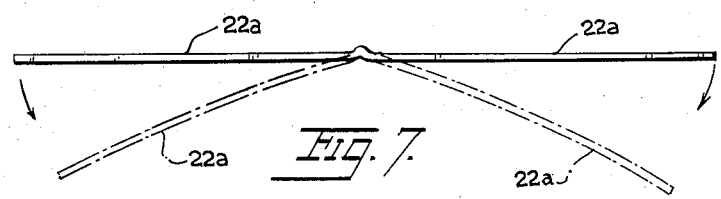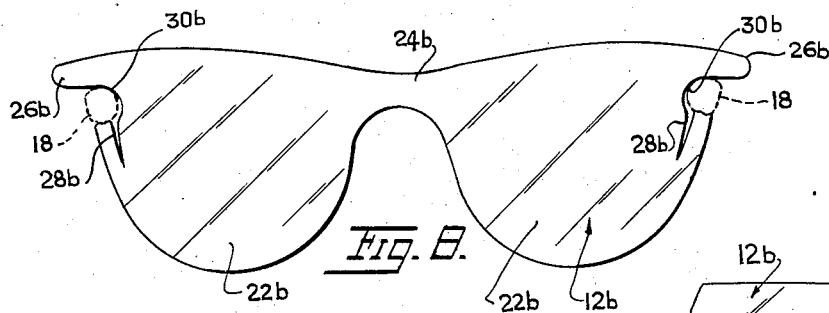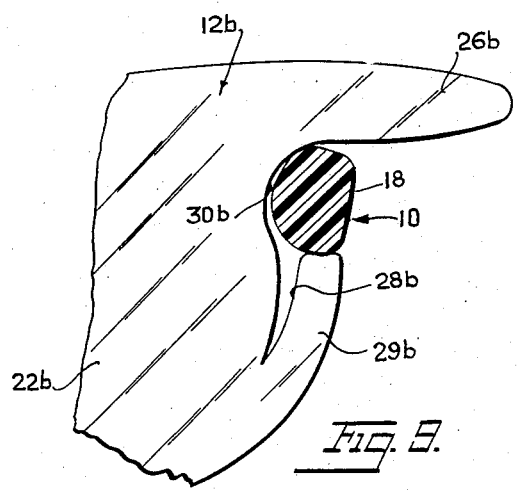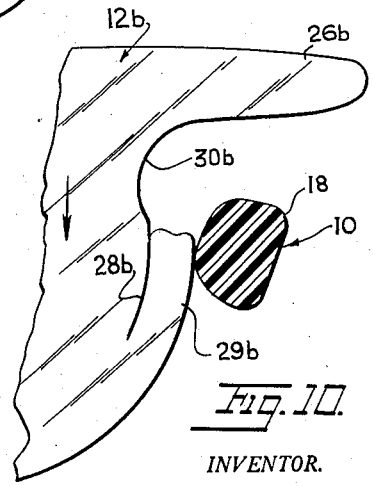

2,901,752

DETACHABLE SUNSHADES FOR EYEGLASSES

Kenneth H. Granger, Englewood, N.J.

Application October 16, 1957, Serial No. 690,465

1 Claim. (Cl. 2—13)

This invention relates to quickly attachable and detachable sunshades for eyeglasses.

Sunshades have been heretofore devised for eyeglasses, which include clamping lugs, adapted to grip the lens frames. However, these are comparatively expensive, and in many cases will fit only certain glasses, that is, they will fit only lens frames of particular shapes in respect to the form and spacing of the clamps.

The main object of the present invention is to provide a quickly detachable anti-glare attachment for eyeglasses, which is merely lowered into place in back of the lens frames and is removed with equal speed and facility.

Another object is to provide, in a device of the character stated, a particularly improved clamping means, adapted to effect a light clamping action of the eyeglass temples against the opposite ends of the anti-glare device.

Still another object is to provide an anti-glare device that will be formed entirely of a single piece of translucent, colored material, thus to permit the device to be stamped out, pressed or molded in quantity in a simple stamping and cutting operation capable of being performed on a large sheet of the anti-glare material.

Still another object is to design a device for use with glasses of various types and sizes, it being mainly important that the temples be spaced apart transversely a prescribed distance, to effect the proper supporting and clamping action.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a pair of eyeglasses and of a glare shield according to the present invention, showing the shield as it is being lowered into place.

Fig. 2 is a transverse sectional view through the eyeglasses, taken substantially on line 2—2 of Fig. 1, with the glare shield in place.

Fig. 3 is a greatly enlarged, fragmentary view on the same cutting plane as Fig. 2.

Fig. 4 is a greatly enlarged, fragmentary elevational view of the glare shield removed from the eyeglasses.

Fig. 5 is an elevational view of a modified glare shield, per se.

Fig. 6 is a transverse section on line 6—6 of Fig. 5.

Fig. 7 is a top plan view of the device shown in Fig. 5, the dotted lines showing a position to which the device may be forced when inserting and removing the same.

Fig. 8 is an elevational view of still another modification, with the eyeglass temples in dotted lines.

Fig. 9 is a view like Fig. 3 of the form of the invention shown in Fig. 8.

Fig. 10 is a view on the same cutting plane as Fig. 9, during the insertion and removal of the modifying device shown in Fig. 8.

Referring to the drawings in detail, designated generally at 10 is a pair of eyeglasses of conventional construction, including a lens frame 11. The anti-glare shield constituting the present invention has been generally designated 12. The eyeglasses, as previously noted, are thoroughly conventional, and thus the lens frame 11 is formed with the usual lens rims 14, connected by a bridge 16 and extending about the lenses 17. Temples 18 are hingedly connected at 20 to the opposite ends of the lens frame 11.

The anti-glare shield constituting the present invention has been formed from a single piece of thin, resilient, flexible, translucent material shaded to produce the desired anti-glare characteristics. Considering the shape of the finished product, this includes lens portions 22, the outer configuration of which approximately matches the configuration of the respective rims. The portions 22 are connected by a bridge portion 24.

The upper longitudinal edge of the shield 12 approximately follows the top edge of the lens frame, but at its opposite ends, the shield 12 is formed with outwardly projecting fingers 26, that project outwardly in overlying relation to the temples 18. The bottom surfaces of the fingers form the top walls of outwardly opening, approximately semicircular end recesses or notches 30, and the recesses 30 intermediate their top and bottom ends (see Figs. 3 and 4) are formed with approximately horizontal slits 28. The slits 28 extend inwardly a short distance from the edges of the recesses, and accordingly the fingers 26 may be sprung upwardly to a slight extent increasing the top to bottom dimensions of the recesses 30, since the slits 28 open slightly as shown in Fig. 3. The fingers 26 are, of course, resiliently biased in a downward direction, so as to tend to normally spring to their Fig. 4 positions.

In use, when the shield is applied, it is longitudinally flexed to a slight extent to permit the outer side edges of the portions 22 to pass the temples 18. The temples thus move into the recesses or notches, and are of a top-to-bottom dimension slightly greater than the normal, corresponding dimension of the recesses 30. Therefore, the slits 28 are opened slightly, and fingers 26 are caused to exert a resilient pressure downwardly upon the top surfaces of the temples 18, causing the temples to be securely clamped in the recesses 30.

In the form of the invention shown in Figs. 5–7, the construction is identical to that previously shown and the difference resides only in the omission of the slits 28, and in the provision, instead, of a short, vertical transverse rim 28$^a$ extending across the bridge 24$^a$ that connects lens portions 22$^a$. The device in this form has been generally designated 12$^a$, and has fingers 26$^a$ forming the top walls of recesses 30$^a$.

The rib 28$^a$ is in the form of a forward crimp, and permits the portions 22$^a$ to be flexed rearwardly, the device in effect hinging on the rib, to facilitate its flexing to a position sufficient to permit the temples to be received in the recesses 30$^a$.

In Figs. 8–10, there is shown another form of the invention generally designated 12$^b$. Again, the device is stamped from a single sheet of material, including lens portions 22 connected by a bridge 24$^b$, and further including fingers 26$^b$ overlying temple-receiving recesses 30$^b$. Opening into the recesses are slits 28$^b$. The slits extend downwardly from the recesses, opening through the bottom edges of the recesses. The slits follow, generally, the curvature of the adjacent side eges of the portions 22$^b$.

In this form, the slits are normally open as in Figs. 8 and 9 and therefore, when the device is being applied, the slits are temporarily closed as at Fig. 10, as the device moves downwardly in this figure of the drawing, past the temple 18. As soon as the temple moves into the recess 30$^b$, the slit is permitted to open, and the finger portion 29$^b$ adjacent the same moves outwardly in underlying relation to the temple 18, thus effectively clamping the device to the temple.

In all forms of the invention, the device is characterized by the speed and ease with which it can be applied to or removed from the glasses, and is further characterized by its very low cost, and its adaptability for being made only in a few sizes and shapes while yet being designed to fit almost all conventional glasses that are in use.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A sunshade attachment for eyeglasses of the type including a pair of temples and a pair of lenses, comprising a translucent body shaped for disposition in back of said lenses, said body being adapted at its opposite ends for support by the respective temples, the body being formed at said ends thereof with laterally outwardly opening notches in which the temples are receivable, said body having slits formed therein and opening into the notches, the body being formed at said ends thereof with outwardly extending horizontally disposed fingers over the notches, the bottom edges of said fingers forming the top walls of the notches, said slits extending in a downward direction from the notches, and being normally spread, the body being under tension effective to permit flexure of the body temporarily to positions closing the slits, the body having vertically disposed finger portions defined between the respective end edges of the body and the adjacent slits, said finger portions being adapted to underlie the temples in the opened positions of the slits and clamp the body to the temples.

References Cited in the file of this patent

UNITED STATES PATENTS

| | | |
|---|---|---|
| 1,310,077 | Heaford | July 15, 1919 |
| 2,456,334 | Shindel | Dec. 14, 1948 |

FOREIGN PATENTS

| | | |
|---|---|---|
| 33,599 | Denmark | Aug. 19, 1924 |
| 290,771 | Great Britain | May 24, 1928 |
| 175,468 | Switzerland | Aug. 1, 1935 |
| 596,276 | Great Britain | Dec. 31, 1947 |